(No Model.) 3 Sheets—Sheet 1.
F. J. RANDALL & G. B. SNOW.
I. F. RANDALL, administratrix of F. J. RANDALL, deceased.
CORN HARVESTER AND HUSKER.
No. 307,225. Patented Oct. 28, 1884.
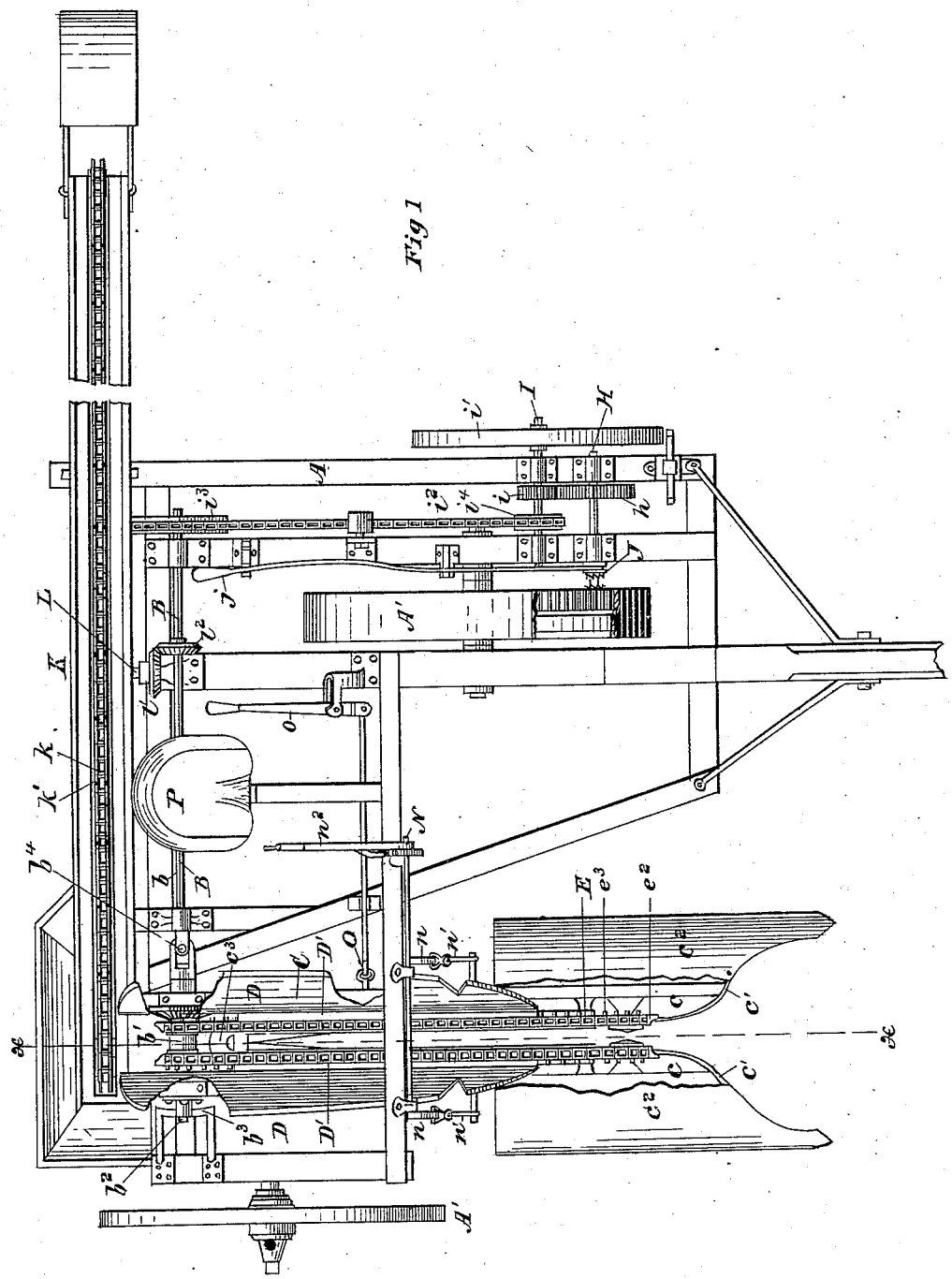
Witnesses
N. C. Coolies
Geo. R. Cutler.
Inventors
Frank J. Randall
Gilbert B. Snow
By Coburn & Thacher
Attorneys (No Model.) 3 Sheets—Sheet 2.
F. J. RANDALL & G. B. SNOW.
I. F. RANDALL, administratrix of F. J. RANDALL, deceased.
CORN HARVESTER AND HUSKER.
No. 307,225. Patented Oct. 28, 1884.
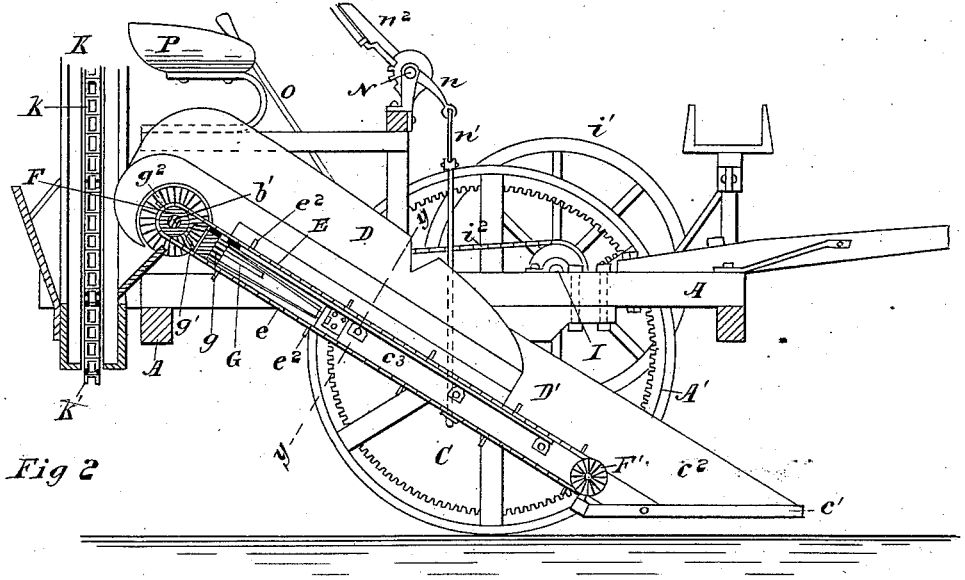
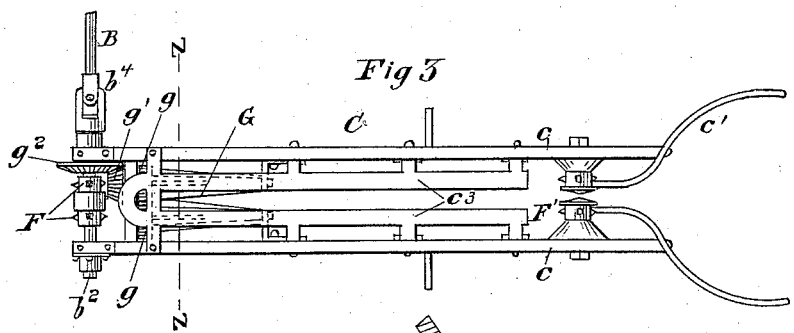
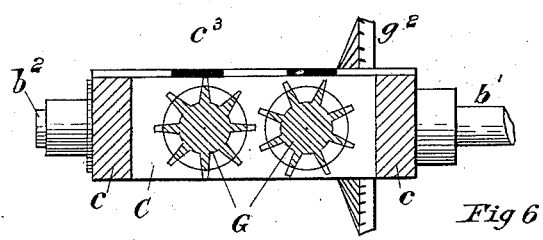
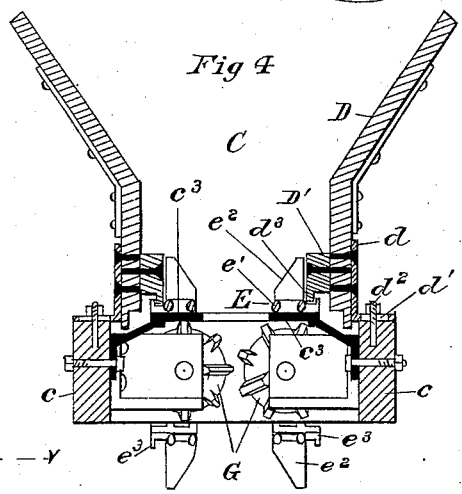
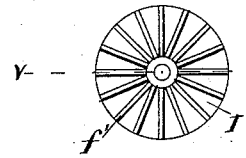
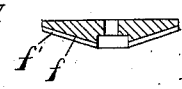
Witnesses
W. C. Cali's
Geo. R. Cutler
Inventors
Frank J Randall
Gilbert B Snow
By Coburn & Thacher
Attorneys
N. PETERS, Photo-Lithographer, Washington, D. C.

(No Model.) 3 Sheets—Sheet 3.
F. J. RANDALL & G. B. SNOW.
I. F. RANDALL, administratrix of F. J. RANDALL, deceased.
CORN HARVESTER AND HUSKER.
No. 307,225. Patented Oct. 28, 1884.
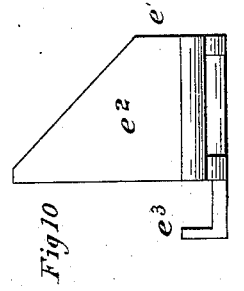
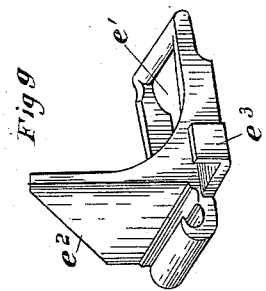
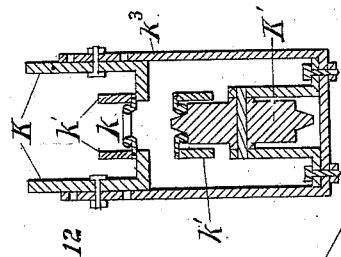
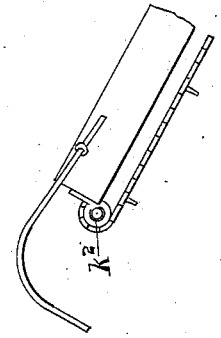
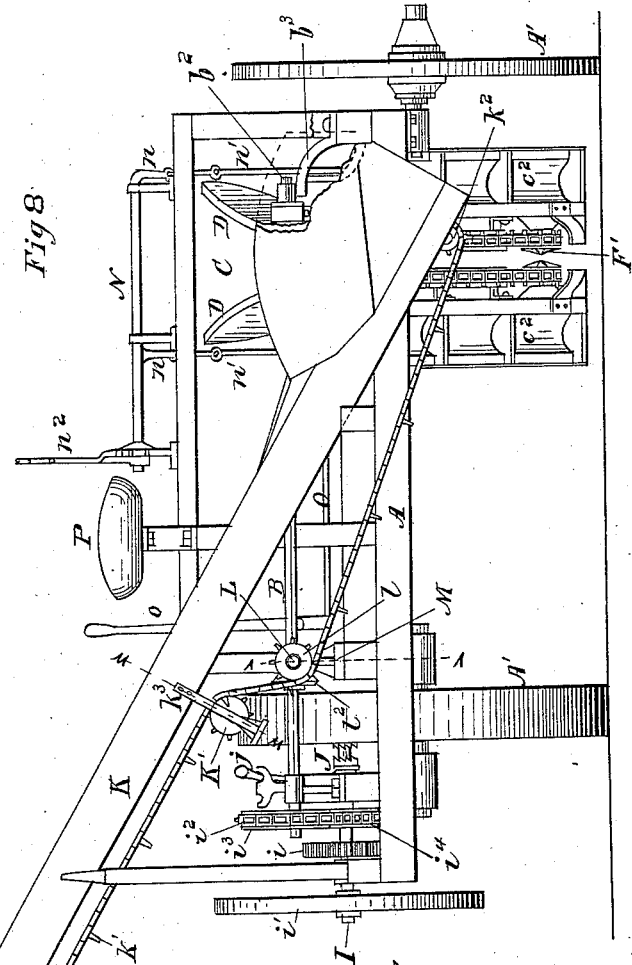
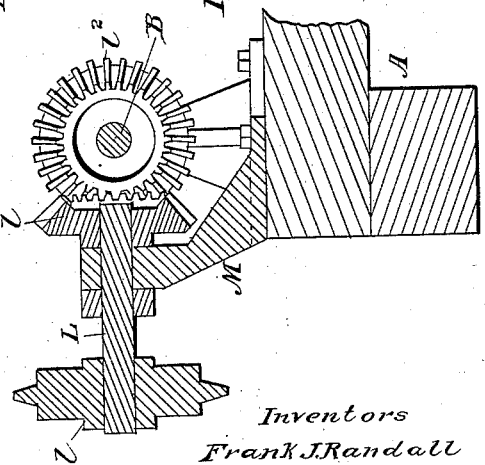
Witnesses
W. C. Cailes
Geo. R. Cutler
Inventors
Frank J. Randall
Gilbert B. Snow
By Coburn & Thacher
Attorneys

UNITED STATES PATENT OFFICE.

FRANK J. RANDALL, OF AURORA, AND GILBERT B. SNOW, OF SUGAR GROVE, ASSIGNORS TO WILLIAM DEERING, OF CHICAGO, ILLINOIS; IDA F. RANDALL ADMINISTRATRIX OF SAID FRANK J. RANDALL, DECEASED.

CORN HARVESTER AND HUSKER.

SPECIFICATION forming part of Letters Patent No. 307,225, dated October 28, 1884.

Application filed February 8, 1882. (No model.)

*To all whom it may concern:*

Be it known that we, FRANK J. RANDALL, a citizen of the United States, and a resident of Aurora, in the county of Kane and State of Illinois, and GILBERT B. SNOW, a citizen of the United States, and a resident of Sugar Grove, in the county of Kane and State of Illinois, have invented certain new and useful Improvements in Corn Harvesters and Huskers, fully set forth in the following specification, reference being had to the accompanying drawings, in which—

Figure 1 represents a plan view of a machine embodying our improvements; Fig. 2, a section of the same, taken on the line $x\ x$ in Fig. 1; Fig. 3, a plan view of the picker-frame detached and the chains removed; Fig. 4, a detail section on an enlarged scale, taken on the line $y\ y$ in Fig. 2; Fig. 5, a similar section taken on the line $z\ z$, Fig. 3; Fig. 6, an elevation of the inner face of the sprocket-wheel at the lower end of the picker-frame; Fig. 7, a section of the same, taken on the line $y\ y$, Fig. 6; Fig. 8, a rear elevation of the machine shown in Fig. 1; Fig. 9, a perspective view of one of the links of the picker-chains; Fig. 10, an end elevation of the same; Fig. 11, a detail section on an enlarged scale, taken on the line $v\ v$, Fig. 8; and Fig. 12, a similar section of the elevator, taken on the line $w\ w$, Fig. 8.

Our invention relates to a machine for picking the ears of corn from the stalks in the field, husking them, and delivering to a wagon running at the side of the machine, or to any other suitable receptacle. Our improvements consist in various devices and combinations of devices looking to the perfecting of different parts of the machine, especially the picking apparatus.

We will proceed to fully describe the construction, organization, and operation of a machine embodying our invention, and will then point out definitely in the claims the particular improvements which we believe to be new and wish to secure by Letters Patent.

Our present invention may be said, in a general way, to be an improvement of the machine shown and described in Letters Patent No. 238,051, granted to us February 22, 1881, though we have very materially changed the organization of the machine, have modified the construction of some of the devices therein shown, and have introduced many new devices.

In the drawings, A represents the main or supporting frame of the machine, which is mounted on carrying-wheels A', the construction and arrangement of these parts being such as will accommodate the mounting of the necessary gearing therein and the attachment of the several mechanisms which are to be supported thereby.

At the rear of the machine is the main driving-shaft B, running almost entirely across the frame. It is composed of two parts, the longer section, $b$, at the left-hand side of the machine, being mounted in stationary bearings, while the shorter section, $b'$, has its outer journal, $b^2$, made adjustable backward and forward on its support $b^3$, and the two sections are united by a universal joint, $b^4$, which permits the vibration of the outer section upon this joint.

The picker-frame C is mounted at its upper end upon the movable section $b'$ of the shaft B, and extends downward and forward, the frame having a vertical vibratory movement with the shaft as its center of motion. It is also obvious that, being connected solely to the shaft-section $b'$, it will also be susceptible of a lateral vibration by the adjustment back and forth of the outer section, $b'$, of the shaft, as described above, the universal joint being the center of this lateral vibratory movement. The pricker-frame C is composed of two parts, $c\ c$—one on each side—constructed and arranged so as to leave a narrow open space between them, and provided with diverging arms $c'\ c'$ on their lower ends, arranged to extend forward in a nearly horizontal position. Wing-boards $c^2$ are attached one to each side of the frame at the lower end, extending upward a short distance, and from their upper ends extend guide-boards D—one on each side of the machine, and inclining outward on each side. These inclined guide-boards are rounded slightly toward their lower ends, so as to give a gradual inclination, and are attached to the side beams of the frame, respectively, by means of bracket-irons $d$, secured to the boards, and at their lower ends bent so as to be seated on the beams, as shown in Fig. 4 of the drawings. Slots $d'$ are made in these lower ends, through which bolts $d^2$ pass to secure the irons to the side beams by means of fastening-nuts. By loosening the nuts these guide-boards may be adjusted laterally in and out with reference to the picker-frame, the object of which will be presently given. On the inside of each of these guide-boards is fastened a strip, $D'$, arranged near the lower edge of the boards, and on the under side of each strip is a projecting spline or guide, $d^3$.

We employ carrying-chains E, arranged to run lengthwise of the picker-frame on each side of the open space, substantially as in our former patent; but the construction of the chains is somewhat different. The links $e$ are mostly plain open links, preferably made detachable from each other at pleasure by any of the devices now well known. Within short distances, however, are interposed links $e'$, which, in addition to the features shown in the other links, are provided with upright projections $e^2$, and on their outer sides bars are provided with bent lugs $e^3$, which extend outward a little distance, and then are bent upward at right angles, as shown in Figs. 9 and 10. The chains run on ways $e^3$, attached to the picker-frame and arranged just below the side strips, $D'$, so that the side lugs, $e^3$, will receive or engage with the spline $d^3$, as shown in Fig. 4. These carrying-chains are driven by sprocket-wheels F on the main shaft, over which they run, being also arranged to run over sprocket-wheels $F'$, arranged on the inside of each of the side bars of the picker-frame and at the lower end thereof. The construction of these lower sprocket-wheels is peculiar in one particular: Their inner faces, $f$, opposing each other, are somewhat enlarged, so as to assume a disk form, and are provided with radial ribs $f'$, as shown in Figs. 6 and 7.

Of course it will be understood that the driving mechanism is arranged so as to move the chains up the incline of the picker-frame on the upper side and down on the under side, so that the ribbed face of the lower sprockets will be rotated in an upward and backward direction. It will also be seen and understood that these chains run along one on each side of the open space in the picker-frame; and obviously from the description given above the lateral adjustment of the guide-boards D will also adjust the chains bodily in and out, to enlarge or diminish the width of the open space between them, such chains being loose or slack enough to permit the adjustment without affecting the sprocket-pulleys.

At the upper end of the picker-frame are short tapering ribbed rolls G, constructed and arranged substantially like similar rolls in our prior patent mentioned above. The upper ends of these rolls are provided with pinions $g$, engaging with each other, and the inner roll is also provided with a bevel-pinion, $g'$, which is driven by a bevel-gear, $g^2$, on the main shaft, as shown in Fig. 3 of the drawings, thus communicating the desired rotatory movement to the rolls. The desired rotary motion is communicated to the driving-shaft B by gearing, driven in this instance, in the ordinary way, from the outer supporting-wheels, in this instance motion being communicated first to a shaft, H, which in turn drives a counter-shaft, I, by means of gear-wheels $h$ $i$ on their respective shafts. The shaft I is provided with a sprocket-wheel, $i^4$, on its inner end and a fly-wheel, $i'$, on its outer end. A chain, $i^2$, runs over the wheel $i^4$, and thence to and over a corresponding wheel, $i^3$, on the outer end of the main driving-shaft. On the shaft H is also an ordinary clutch, J, by means of which the shaft is connected to and disconnected from the loose pinion thereon, which engages with the gearing on the main wheel. The clutch is moved back and forth by an ordinary forked lever, $j$, by means of which the operative mechanism belonging to the machine may be stopped or started.

At the rear end of the machine is an elevator, K, extending from just in rear of the picker-frame upward and outward beyond the outside of the machine in suitable position to deliver the ears of corn into a wagon running alongside the machine or a receptacle attached thereto. This elevator K is provided with an ordinary elevator-chain, $k$, the links of which, at suitable intervals, are provided with carrying projections $k'$, the chain being arranged to run over sprocket-wheels $k^2$ at the upper and lower ends of the elevator. The projections $k'$ are attached to each side of the link which carries them, leaving an open space between them, as shown in Figs. 1 and 12 of the drawings. This construction is for the purpose of accommodating the tightening-wheel $K'$, which is arranged in a hanger, $k^3$, depending from the elevator, and adjustable up and down therein. This arrangement, as shown in Fig. 8 of the drawings, places the tightener on the outside of the chain, and if the carrying projections extended across the links, as usual, of course they would interfere with the tightener, preventing its sprocket from engaging with the links; but constructed, as above described, with an open space between them, the tightening-wheel is permitted to run between these projections, being thin enough for this purpose, and so engages readily with all the links. This elevator-chain is driven by one wheel directly from the driving shaft in the following manner: A short shaft, L, is arranged at right angles to the main driving-shaft, being mounted on a standard, M, on the rear part of the main frame. This shaft carries at its rear end a sprocket-wheel, $l$, which engages directly with the elevator-chain, inside of which it runs, as shown in Fig. 8 of the drawings. On the forward end of the shaft is a bevel gear-wheel, $l'$, with which a similar gear-wheel, $l^3$, on the main driving-shaft engages, thereby communicating motion directly to the shaft L, which in turn drives the elevator-chain. The standard M is also constructed to support and provide a bearing for the main driving-shaft, so that at this point both it and the short shaft L are supported by the same standard, this construction and arrangement of standard and gearing being shown in Fig. 11 of the drawings.

A rock-shaft, N, is mounted on a cross-beam of the main frame over the picker-frame, and is provided with crank-arms $n$, from which links $n'$ extend downward, and are attached to the sides of the picker-frame. A hand-lever, $n^2$, is fastened to the inner end of this rock-shaft, by means of which the latter is operated to raise and lower the picker-frame. An ordinary detent or other fastening device is provided for this lever, to secure it in any desired position.

A rod, O, is carried on the main frame at right angles to the picker-frame, and is secured in such a way as to permit a sliding movement lengthwise. One end of the rod is connected by a suitable hinge-joint to the picker-frame, and the other end is pivoted to the lower end of a pivoted hand-lever, $o$, arranged to vibrate so as to slide the rod back and forth, by which movement, obviously, the picker-frame will be vibrated laterally, this motion being permitted by the universal joint in the driving-shaft and the loose support of its inner end. The hand-levers mentioned above are arranged so as to be conveniently reached from the driver's seat P, mounted on the main frame, so that the attendant will have complete control of the picker-frame.

Remarking now that many of the special devices and details of construction may be modified, and therefore we do not wish to be understood as limiting ourselves in all particulars to the special construction and arrangement above set forth, we will proceed to describe the operation of the machine here shown and illustrated.

The machine is drawn forward so that the fingers at the lower end of the picker-frame will straddle the row of stalks from which it is desired to pick the ears and the mechanism thrown into gear, when obviously the picker-chains and rolls will be set in motion, together with the elevator-chain. Now, as the machine is drawn forward the picker-frame is raised and lowered by the attendant so that the fingers will pass under the lopping stalks, lifting them up and guiding them to the chains as the picker-frame progresses. The attendant also vibrates the picker-frame laterally, as occasion requires, to follow the corn-row and bring the fingers into position to pick up the lopping ears. It will also be evident that the downwardly-projecting curved fingers, bearing on one or more stalks of corn outside the row, will cause the picker-frame to swing laterally on the universal joint $b^4$, and will bring the opening in such frame in line with the stalk, this adjustment being automatically accomplished. As the chains are brought up to the stalks, the ribbed faces of the sprocket-wheels assist to force the stalks inward and prevent clogging. The chains, with their projections, carry the stalks upward and backward positively as the picker-frame advances, the stalks being guided in the central open space of the frame and the chains held in proper relative position by the guide-splines $e^3$, until finally the picking and husking rolls at the rear are reached, into the opening between which the stalks are drawn, and the ears broken therefrom by the action of the ribs on the rolls, and this action of the ribs is always so close to the butt of the ear that the husks will nearly or quite all be taken away with the stalks. The stalks pass out at the rear of the machine, and the ears of corn, either wholly or nearly husked, are carried back into the receptacle at the bottom of the elevator, from which they are carried up by the elevator-chain and delivered into a wagon at the side of the machine or a receptacle in the latter. The picker-chains are adjusted nearer to or farther from each other, according to the space required for the stalks differing in size and quantity.

Having thus described our invention, what we claim as new, and desire to secure by Letters Patent, is—

1. In a corn-harvester, the main supporting-frame and the laterally-adjustable supplemental frame provided with mechanism for engaging the stalks and conveying them into the picking mechanism, combined with means, substantially as described, under the control of the attendant, whereby the lateral adjustment of the said supplemental gathering device is made controllable at will.

2. In a corn-harvester, the laterally-adjustable picking device, combined with mechanism located in advance for engaging outstanding hills of corn, and thus automatically direct the picking mechanism thereto, substantially as described.

3. In a corn-harvester, the main frame, the laterally-adjustable picker-frame, and means under the control of the attendant whereby the said picking mechanism is controllable at will, substantially as described.

4. In a corn-harvester, the main frame, the driving-gearing located thereon, the supplemental horizontally-adjustable frame, the picking devices located therein, and means, substantially such as described, for transmitting power from the motive gearing to the said adjustable picking devices, substantially as described.

5. In a corn-harvester, a main frame, the driving-gearing mounted thereon, the supplemental frame capable of both vertical and lateral adjustment, the picking devices located thereon, and means, substantially such as described, for transmitting power from the driving-gearing to the said universally-adjustable picking devices, as set forth.

6. In a corn-harvester, the combination of the following elements: the main frame, the gearing mounted thereon, the supplemental universally-adjustable frame, the picking devices mounted thereon, the mechanism for transmitting power from the main gearing to the universally-adjustable picking mechanism, and means whereby the said adjustments are controlled at will, substantially as described.

7. In a corn-harvester, the main frame supporting the elevating mechanism, said elevating mechanism provided with a fixed hopper, in combination with picking mechanism and means whereby it may be adjusted laterally and yet deliver the ears of corn into the said hopper at all times regardless of the positions of adjustment, substantially as described.

8. In a corn-harvester, the elevator and the laterally-adjustable picking mechanism adapted to deliver the ears thereto, combined with the driving-gearing adapted to simultaneously impart motion to the fixed elevating mechanism and to the said laterally-adjustable mechanism, substantially as described.

9. The combination of the main supporting-frame, the horizontally and vertically adjustable supplemental frame carrying the gathering and picking devices, the horizontal rock-shaft N for raising said supplemental frame, and means for connecting such shaft to the said frame so as to permit the lateral adjustment of the latter, substantially as described.

10. The combination of the main frame, the shaft $b$, the supplemental adjustable frame, the shaft $b'$, and means by which said shafts $b$ $b'$ are connected for transmitting power from the former to the latter, substantially as described.

11. The shaft B, composed of the sections $b$ $b'$, connected by a universal joint, in combination with the support $b^3$, on which the journal $b^2$ of the section $b'$ is loosely mounted, the picker-frame C, attached at its upper end to the adjustable section of the shaft, and devices whereby the attendant may vibrate the picker-frame and adjustable shaft-section laterally, substantially as described.

12. The shaft B, composed of the sections $b$ $b'$, connected by a universal joint, in combination with the support $b^3$, on which the journal $b^2$ of the adjustable section $b'$ is loosely mounted, and the picker-frame C, journaled at its upper end to the adjustable section of the shaft, whereby the picker-frame may be vibrated vertically about the shaft and laterally with the shaft, substantially as described.

13. The shaft B, composed of the sections $b$ $b'$, connected by a universal joint, in combination with the support $b^3$, on which the journal $b^2$ of the adjustable section $b'$ is loosely mounted, the picker-frame C, journaled at its upper end to the adjustable section of the shaft, and suitable lever devices whereby the attendant on the machine may at will raise and lower the picker-frame and vibrate it laterally, substantially as described.

14. In a corn-harvesting machine, the picker-frame, in combination with carrying-chains and mechanism whereby the chains may be adjusted laterally with reference to each other, substantially as and for the purposes set forth.

15. The carrying-chains provided with more or less links having bent side lugs, $e^3$, in combination with the side strips, D′, provided with guiding-flanges, substantially as and for the purposes described.

16. The laterally-adjustable guide-boards D, in combination with the inner side strips, D′, provided with guide-flanges $d^3$, and the carrying-chains E, having more or less links provided with bent side lugs, $e^3$, substantially as and for the purposes described.

17. The sprocket-wheels F at the lower end of the picker-frame, having their inner faces provided with ribs $f'$, substantially as and for the purposes specified.

18. The combination of the driving-shaft B, chain $k$, having supporting-rollers $k^2$, and the intermediate sprocket-wheel, $l$, fixed on a shaft, L, and driven from the said shaft B, substantially as described.

19. The drive-shaft B, provided with the bevel-gear $l^2$, in combination with the shaft L, provided with the sprocket-wheel $l$, and bevel-gear $l'$, the standard M, having journal-bearings for both shafts, and the elevator-chain $k$, substantially as described.

20. The picker-frame C, in combination with the adjustable carrying-chains E, and the picking and husking rolls G, substantially as described.

21. The vertically-vibrating picker-frame, in combination with the rock-shaft N, provided with crank-arms $n$, links $n'$, and lever $n^2$, substantially as described.

22. The laterally-vibrating picker-frame, in combination with the sliding rod O, and lever $o$, substantially as described.

FRANK J. RANDALL.
GILBERT B. SNOW.

Witnesses:
PIERCE BURTON,
WM. LORD, Jr.